United States Patent [19]
Milani et al.

[11] Patent Number: 5,739,264
[45] Date of Patent: Apr. 14, 1998

[54] PROCESS FOR THE PREPARATION OF COPOLYMERS BASED ON CARBON MONOXIDE AND AT LEAST ONE COMPOUND HAVING AN ALKENYLIC UNSATURATION

[75] Inventors: Barbara Milani, Gorizia; Giovanni Mestroni, Trieste; Anna Sommazzi, S. Margherita Ligure; Fabio Garbassi, Novara, all of Italy

[73] Assignee: Enichem S.P.A., Milan, Italy

[21] Appl. No.: 604,651

[22] Filed: Feb. 21, 1996

[30] Foreign Application Priority Data

Feb. 23, 1995 [IT] Italy ................... MI95A0337

[51] Int. Cl.$^6$ ................... C08G 67/02
[52] U.S. Cl. ............... 528/392; 528/392; 524/706; 524/707; 524/709; 524/711; 502/102; 502/103
[58] Field of Search ............... 528/392; 524/706, 524/707, 709, 711; 502/102, 103

[56] References Cited

U.S. PATENT DOCUMENTS

| | | |
|---|---|---|
| 5,310,871 | 5/1994 | Sommazzi et al. . |
| 5,314,856 | 5/1994 | Sommazzi et al. . |
| 5,338,825 | 8/1994 | Bradford et al. ............. 528/392 |
| 5,346,873 | 9/1994 | Sommazzi et al. . |
| 5,408,030 | 4/1995 | Sommazzi et al. . |

FOREIGN PATENT DOCUMENTS

| | | |
|---|---|---|
| 0 181 014 | 5/1986 | European Pat. Off. . |
| 0 610 601 | 8/1994 | European Pat. Off. . |

Primary Examiner—Samuel A. Acquah
Attorney, Agent, or Firm—Oblon, Spivak, McClelland, Maier & Neustadt, P.C.

[57] ABSTRACT

A process for the preparation of alternated linear copolymers based on carbon monoxide and one or more compounds having an unsaturation of the alkenylic type comprises, reacting in a halogenated aromatic or aliphatic solvent the carbon monoxide and one or more compounds having an alkenylic unsaturation in the presence of a catalyst having general formula (I)

$$[Pd(chel)(chel')]^+[A^-]$$

wherein: chel represents a non-charged bidentate chelating agent, chel' represents the anion of an organic compound containing a double carbon—carbon bond co-ordinated via π bond to palladium (Pd) and a carbanion bound via σ bond to palladium which is co-ordinated to the metal as a bidentate chelating agent and $A^-$ is an anion of a non-esterifiable or almost non-esterifiable and non-coordinating acid.

24 Claims, No Drawings

PROCESS FOR THE PREPARATION OF COPOLYMERS BASED ON CARBON MONOXIDE AND AT LEAST ONE COMPOUND HAVING AN ALKENYLIC UNSATURATION

The present invention relates to a process for the preparation of alternated linear copolymers based on carbon monoxide and one or more compounds having an unsaturation of the alkenylic type.

Various catalytic processes are known in the art for the polymerization of mixtures of carbon monoxide (CO) and one or more compounds containing an alkenylic unsaturation suitable for producing linear copolymers in which the unit CO/compound containing an alkenylic unsaturation is repeated alternately. The polymerization of these units can be carried out in gas phase or in liquid phase in polymerization diluents, preferably methanol, in the presence of proper catalytic systems.

The catalytic systems generally used in these processes derive from the combination of:

1) a salt of a metal belonging to the eighth group of the periodic table;
2) a bidentate base, generally consisting of an alkyl or cycloalkyl hydrocarbon symmetrically substituted by two dialkylphosphinic or diphenylphosphinic groups or by two groups containing at least one nitrogen atom; and
3) an anion of an acid, preferably an acid with a pKa of less than 2.

These catalytic systems are, for example, described in patents EP-121.965, EP-22.454, EP257.663, EP-305.012 and allow alternated olefin/CO polymers to be obtained with good yields operating at high temperatures and pressures.

Some variations of this consist in adding a fourth component to the catalytic system, selected from compounds belonging to the group of quinones, organic oxidants or aromatic nitrocompounds as described in patents EP-229.408, EP-245893 and EP-343.734.

These processes of the known art however have disadvantages deriving from the fact that the catalytic systems require the presence of an acid co-catalyst which not only creates problems of a technological nature, for example corrosion of the autoclaves, but also tends to become englobed in the polymer reducing its properties.

In order to overcome this inconvenience a process has recently been proposed for the preparation of CO/ethylene polymers which is based on the use of complexes of palladium which contain two nitrogenated or phosphorated bidentate chelating agents for one palladium atom and two non-esterifiable or practically non-esterifiable, non-co-ordinating, active anions without an acid co-catalyst (Italian patent application MI91A/2969).

According to this process the polymerization of CO/ethylene mixtures is carried out in an alcoholic diluent under high operating conditions (temperature and pressure) to obtain the copolymer with high yields.

It is known that the effect of the temperature on the reaction yields is opposite to that which can be observed on the molecular weight. This means that, with the same operating conditions, an increase of temperature produces an increase in the reaction yields but a reduction in the molecular weight of the copolymers thus obtained.

A process which is economically valid for the preparation of these copolymers should therefore be carried out at low temperatures with high kinetics.

It has now been found that it is possible to overcome the disadvantages of the known art with the process of the present invention which is based on the combination of a catalyst having general formula (I) with a halogenated aromatic or aliphatic solvent which is liquid under the operating conditions.

It is therefore possible to prepare, without acid cocatalysts and under bland operating conditions (temperature and pressure) alternated linear copolymers based on carbon monoxide and at least one compound containing an unsaturation of the alkenylic type with good yields and good molecular weights.

It has also been found that this combination enables a copolymer to be obtained, having a very limited molecular weight distribution, with Mw/Mn values very close to 1, which suggests a living-type polymerization.

In accordance with this, a first aspect of the present invention relates to a process for the preparation of alternated linear copolymers based on carbon monoxide and at least one compound containing an alkenylic unsaturation which comprises, reacting in a halogenated aromatic or aliphatic solvent, liquid under the operating conditions, the carbon monoxide and one or more compounds containing an unsaturation of the alkenylic type in the presence of a catalyst having general formula (I)

$$[Pd(chel)(chel')]^+[A^-]$$

wherein: chel represents a non-charged bidentate chelating agent, chel' represents the anion of an organic compound containing a double carbon—carbon bond linked via $\pi$ bond to palladium (Pd) and a carbanion bound via $\sigma$ bond to palladium which is co-ordinated to the metal as a bidentate chelating agent and $A^-$ is an anion of a non-esterifiable or almost non-esterifiable and non-co-ordinating acid.

In the catalyst having general formula (I) chel can be a nitrogenated (N—N), phosphorated (P—P) or mixed (N—P) bidentate chelating agent.

Nitrogenated bidentate chelating agents can be selected from those having general formula (II)

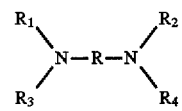

wherein:
R represents a $C_2$-$C_4$ alkyl radical possibly substituted with an alkyl or aryl group; $R_1$-$R_4$, the same or different, each represent a $C_1$-$C_{10}$ alkyl radical, $C_3$-$C_{10}$ cycloalkyl radical or a $C_6$-$C_{12}$ aromatic radical possibly substituted with a $C_1$-$C_4$ alkyl or alkoxyl radical; or from those having general formula (III):

wherein:
X and Y, the same or different, represent a bridged organic group having at least three atoms in the bridge of which at least two are carbon atoms. When the X and Y groups contain other atoms, in addition to the carbon atoms, these are preferably selected from oxygen and nitrogen;
Z represents an organic group selected from the derivatives of 2,3-butandiol and 1,2-propandiol which prevents free rotation around the carbon—carbon bond giving the chelating agent an atropoisomeric type configuration;

or from those having general formula (IV):

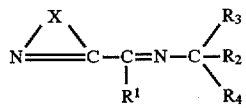

wherein:

X represents a bridged organic group having at least three atoms in the bridge of which at least two are carbon atoms; when the X group contains other atoms, in addition to the carbon atoms, these are preferably selected from oxygen or nitrogen; $R_1$ represents a hydrogen atom, an alkyl or aryl group; $R_2$, $R_3$ and $R_4$, the same or different, represent an alkyl, alkylaryl or aryl group. When the groups are different, the carbon atom bound to $R_2$, $R_3$ and $R_4$, becomes a chiral centre (N—N—R*).

Examples of nitrogenated chelating agents are: N,N,N'N'-tetramethylethylenediamine-1,2 (TMED); N,N,N',N'-tetramethylpropanediamine-1,3 (TMPD); 2,2'-bipyridyl (bipy); 4,4'-dimethyl-2,2'-bipyridyl (DM-bipy); 4,4'-diphenyl-2,2'-bipyridyl (DP-bipy); (−)-3,3'-[2,2-butandiol]-2,2'bipyridyl (bbipy); (+)-3,3'-[2,3-propandiol]-2,2'-bipyridyl (pbipy); 5,5'-dimethyl-2,2'-bipyridyl; 5-methyl-2,2'-bipyridyl; 1,10-phenanthroline (phen); 4-methyl-1,10-phenanthroline (4M—phen); 5-methyl-1,10-phenanthroline (5 M—phen); 4,7-dimethyl-1,10-phenanthroline (DM—phen); 3,8-dimethyl-1,10-phenanthroline; 4,7-diphenyl-1,10-phenanthroline (PH—phen); 4,7-dichloro-1,10-phenanthroline; 3,4,7,8-tetramethyl-1,10-phenanthroline (TM—phen); 4,4'-dimeth-yl-5,5'bioxazol; 2,2'-bipyrimidine; 2,2'-tetrahydro-bioxazol; 2-pyridinalmethylimine (PMI); 2-pyridinalphenylethylimine (PPEI).

Phosphorated bidentate chelating agents are selected from those having general formula (V):

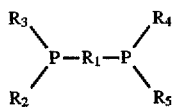

wherein:

$R_1$ represents a $C_1$–$C_4$ alkyl radical possibly substituted with an alkyl or aryl group; $R_2$–$R_5$, the same or different, each represent a $C_1$–$C_{10}$ alkyl radical, $C_3$–$C_{10}$ cycloalkyl radical or a $C_6$–$C_{12}$ aromatic radical possibly substituted with a $C_1$–$C_4$ alkyl or alkoxyl radical.

Examples of phosphorated bidentate chelating agents for the purposes of the present invention are selected from 1,3-bis-(diphenylphosphine) propane (DPPP), 1,3-bis(di-4-methoxy-phenylphosphine) propane, 1,4-bis(dicyclohexylphosphine)-butane and 1,2-bis(di-phenylphosphine)cyclohexane.

Organic compounds (chel') of the present invention are selected from compounds which contain an unsaturated cyclic portion in their molecule. These compounds are preferably mono or bicyclic olefins which have a substituent X—R group wherein X is O or N and R is an alkyl, aryl or aryl alkyl group. Examples of these compounds are 5-methoxy-cycloct-1-ene, 5-methoxy-2-norbornene.

In the catalysts having general formula (I), $A^-$ is an anion which is basically non-co-ordinating and non-esterifiable selected from hexafluorophosphate, tetra-fluoroborate, fluoride ion, hexafluoroantimoniate, trifluoroacetate, mesitoate (Mes), dimethylbenzoate, trifluorobenzoate, tetrafluorobenzoate, pentafluoro-benzoate, etc. Hexafluorophosphate ($PF_6$) is preferred.

The catalysts having general formula (I) of the present invention can be prepared with the conventional techniques. In particular reference can be made to the methods described in E. Rotondo et al., Inorg. Chem., 15:2102 (1976).

Examples of catalysts having general formula (I) of the present invention are:
[Pd(bipy)(COD—OCH₃)]⁺[PF₆]⁻
[Pd(bipy)(NBD—OCH₃)]⁺[PF₆]⁻
[Pd(DM-bipy)(COD—OCH₃)]⁺[PF₆]⁻
[Pd(phen)(COD—OCH₃)]⁺[PF₆]⁻
[Pd(TM—phen)(COD—OCH₃)]⁺[PF₆]⁻
[Pd(phen)(NBD—OCH₃)]⁺[PF₆]⁻
[Pd(PMI)(COD—OCH₃)]⁺[PF₆]⁻
[Pd(p-bipy)(COD—OCH₃)]⁺[PF₆]⁻
[Pd(PPEI)(COD—OCH₃)]⁺[PF₆]⁻
[Pd(TMED)(COD—OCH₃)]⁺[PF₆]⁻
[Pd(TMPD)(COD—OCH₃)]⁺[PF₆]⁻
[Pd(DPPP)(COD—OCH₃)]⁺[PF₆]⁻

The quantity of catalyst (I) used in the process of the present invention can vary within a wide range.

Generally a quantity of catalyst is used which is sufficient to give a concentration of gram-atoms of palladium per mole of compound containing an alkenylic unsaturation of between $10^{-6}$ and $10^{-1}$, preferably between $10^{-6}$ and $10^{-3}$.

Monomers containing an alkenylic unsaturation suitable for the purposes of the present invention comprise compounds which exclusively consist of carbon and hydrogen and compounds which additionally comprise one or more heteroatoms, such as unsaturated esters. Unsaturated hydrocarbons with a number of carbon atoms of between 2 and 12, are preferred.

Examples of these compounds are olefins such as ethylene, propylene, 1-butene, isobutylene, 1-pentene, 1-hexene, 1-octene, 1-dodecene or cyclic compounds such as cyclopentene or aromatics such as styrene, p-methyl-styrene, m-methyl-styrene, p-ethyl-styrene, m-isopropyl-styrene, norbornene. For the purposes of the present invention, ethylene, propylene and styrene or their mixtures, are preferred.

The molar ratio between the carbon monoxide monomers and the monomers containing an alkenylic unsaturation is generally between 1:10 and 10:1, preferably between 1:5 and 5:1. An equimolecular ratio is particularly preferred.

The process of the present invention is conveniently carried out by putting the catalyst (I) in contact with the carbon monoxide and one or more compounds containing an alkenylic unsaturation in a diluent which is liquid under the operating conditions selected from halogenated, especially chlorinated, aromatic or aliphatic compounds, such as for example benzene, toluene, chlorobenzene, dichloromethane, dichloroethane, chloroform.

Dichloromethane and dichloroethane are preferred for the purposes of the present invention.

The polymerization is generally carried out at temperatures of between 20° and 100° C. and at a pressure of between 1 and 100 bars. The temperature is conveniently between 30° and 50° C. and the pressure not higher than 40 bars.

At the end of the polymerization the catalyst is deactivated and the copolymer is recovered, with the usual separation techniques, in the form of a white solid. The intrinsic viscosity (LVN) is measured in m-cresol at 100° C. according to ASTM D2857-70 (1977). The copolymers of the present invention have an LVN of between 0.1 and 5 dl/g, preferably between 0.2 and 4 dl/g.

The average molecular weights Mn and Mw, where Mn refers to the number average molecular weight and Mw to the weight average molecular weight, were determined in the mixture phenol/trichorobenzene (50:50 v/v) by Gel Permeation Chromatography (GPC), using a Waters 150-c ALC/GPC instrument with a set of 4 Styragel®HT columns ($10^3$–$10^4$–$10^5$–$10^6$ A°)

The copolymers thus obtained can be characterized by analytical techniques such as NMR and FT—IR. The results of these analyses confirm that the copolymers obtained by the process of the present invention have an alternated linear structure and a greater stereo-regularity with respect to the copolymers obtained with the comparative catalysts.

These copolymers can be used in specialized fields and in particular structural applications for example car panels, plastic films and in the field of packaging.

Copolymers with a low molecular weight can be used for preparing shaped bodies obtained with normal transformation techniques such as moulding, injection, extrusion, thermoforming, etc.

The following illustrative examples provide a better understanding of the present invention but do not limit its scope in any way.

EXAMPLE 1

A) Synthesis of [Pd (bipy)(COD—$OCH_3$)][$PF_6$]

0.80 g of anhydrous $Na_2CO_3$ (7.5 mmoles) are added to a yellow suspension of 2.0 g of [Pd(COD)$Cl_2$](7 mmoles) in 180 ml of methanol and the mixture is left to react at room temperature for 50 minutes. The colour of the suspension gradually changes from yellow to white. The white solid is filtered, washed with cold methanol and ethyl ether and is dried under vacuum (yield 95%).

0.75 g (1.33 mmoles) of white solid [Pd(COD—$OCH_3$)Cl]$_2$ (d-(1-methoxy-cyclocta-4-ene-8σ,4π)-μμ1-dichlorodipalladium) are suspended in 60 ml of methanol. 0.5 g of 2,2'-bipyridyl (bipy) (3.2 mmoles) are added to the suspension (ratio in moles Pd:bipy equal to 1:1.2) obtaining a yellow solution to which a solution of ammonium hexafluorophosphate ($NG_4PF_6$) (0.88g) im methanol (7 ml) is added dropwise. After about 3 minutes a microcrystalline solid precipitates which, after 30 minutes, is filtered, washed with ethyl ether and dried under vacuum (yield 85%).

Elemental analysis for [Pd(bipy)(COD—$OCH_3$)][$PF_6$][(2,2'-dipyridyl)(1-methoxy-cyclocta-4-ene-8σ,4π)-palladium hexafluorophosphate] calculated values: C 41.7%, H 4.24&, N 5.12%; actual values: C 41.0%, H 4.14%, N 4.94%

B) Preparation of the CO/styrene Copolymer 20 ml of dichloromethane ($CH_2Cl_2$), 0.05 mmoles of [Pd(bipy)(COD—$OCH_3$)$^+$[$PF_6$]$^-$ and 10 ml of styrene are introduced into a three-necked glass flask having a capacity of 100 ml and equipped with a reflux condenser, magnetically stirred and placed in an oil bath thermostat-regulated at 30° C.

Carbon monoxide is bubbled into the solution for 2 hours (pressure 1 atm). The copolymer is then precipitated by adding methanol (150 ml), separated by filtration, washed with methanol and dried at room temperature.

0.94 g of alternated copolymer are obtained, resulting from NMR analysis, corresponding to 177 g of CP/g of Pd. The copolymer has an LVN equal to 0.16 dl/g.

EXAMPLE 2

The same procedure is carried out as in example 1, using dichloroethane as solvent in the polymerization phase. 1.1 g of alternated copolymer are obtained corresponding to 207 g of CP/g of Pd. The copolymer has an LVN of 0.16 dl/g.

EXAMPLE 3 (Comparative)

The same procedure is carried out as in example 1, using 20 ml of anhydrous methanol and 1 mmole of p-benzoquinone in the polymerization phase. 0.58 g of alternated copolymer are obtained corresponding to 109 g of CP/g of Pd.

The copolymer has an LVN of 0.09 dl/g, an Mn=13,400, Mw=30,200 and a ratio Mw/Mn equal to 2.25.

EXAMPLE 4 (Comparative)

The same procedure is carried out as in example 1, using the catalyst [Pd(bipy)$_2$][$PF_6$]$_2$. 0.09 g of alternated copolymer are obtained resulting from NMR analysis, having an LVN equal to 0.08 dl/g.

EXAMPLE 5

20 ml of dichloromethane ($CH_2Cl_2$), 0.05 mmoles of [Pd(bipy)(COD—$OCH_3$)]$^+$[$PF_6$]$^-$ and 10 ml of styrene are introduced into a 250 ml autoclave equipped with a telfon liner.

The autoclave is charged with a pressure of CO of 40 atm measured at room temperature. After 6 hours of reaction at 50° C., the autoclave is cooled to room temperature and the non-reacted gas is discharged. The copolymer is precipitated with methanol (150 ml), filtered and after washing with methanol is dried in an oven at 60° C.

2.08 g of alternated polymer are obtained, resulting from NMR analysis, corresponding to 392 g of CP/g of Pd.

The copolymer has an LVN of 0.14 dl/g.

EXAMPLE 6 (Comparative)

The same procedure is carried out as in example 5, using 0.05 mmoles of Pd(bipy)($CF_3COO$)$_2$.

1.102 g of alternated polymer are obtained corresponding to 207 g of CP/g of Pd.

The copolymer has an LVN of 0.06 dl/g.

EXAMPLE 7

The same procedure is carried out as in example 1, using 10 ml of p-Me-styrene. The solution is filtered on celite®. On the addition of 200 ml of methanol a white solid precipitates. It is filtered and dried in an oven at 60° C.

1.102 g of alternated copolymer are obtained corresponding to 207 g of CP/g of Pd.

The copolymer has an LVN of 0.16 dl/g, an Mn=31,200, Mw=35,100 and Mw/Mn=1.12.

EXAMPLE 8

The same procedure is carried out as in example 1, using a mixture (10 ml) of styrene (8 ml) and p-Me-styrene (2 ml). 0.91 g of alternated terpolymer are obtained corresponding to 171 g of TP/g of Pd. The terpolymer has an LVN of 0.13 dl/g.

EXAMPLE 9

A) Synthesis of [Pd(phen)(COD—$OCH_3$)][$PF_6$]

0.75 g (1.33mmoles) of [Pd(COD—$OCH_3$)Cl]$_2$, obtained as described in example 1, are suspended in 60 ml of methanol. 0.63 g of 1,10-phenanthroline (phen) are added to the suspension (ratio in moles Pd:phen equal to 1:1.2) obtaining a yellow solution to which a solution of NH$_4$PF$_6$ (0.88 g) in methanol (7 ml) is added dropwise. The system is left under stirring at room temperature for 30 minutes, then the solid is filtered under vacuum, washed with ethyl ether and dried under vacuum (yield 80%).

Elemental analysis for [Pd(phen)(COD—OCH$_3$)][PF$_6$]: calculated values: C 44.2%, H 4.06%, N 4.91%; values found: C 44.0%, H 3.91%, N 4.90%;

B) Preparation of CO/styrene Copolymer

The same procedure is carried out as in example 1, using 0.05 moles of catalyst prepared in A).

0.61 g of alternated copolymer are obtained corresponding to 115 g of CP/g of Pd. The copolymer has an LVN of 0.2 dl/g.

EXAMPLE 10 (Comparative)

The same procedure is carried out as in example 9, using in the polymerization phase a mixture (20 ml) of CH$_2$Cl$_2$ and methanol in a ratio of 3:1. 0.40 g of alternated copolymer are obtained corresponding to 75 g of CP/g of Pd. The copolymer has an LVN of 0.1 dl/g.

EXAMPLE 11 (Comparative)

The same procedure is carried out as in example 10, using 0.05 mmoles of the comparative catalyst Pd(phen)(CF$_3$COO)$_2$. No polymer is obtained.

EXAMPLE 12 (Comparative)

The same procedure is carried out as in example 10, using 0.05 mmoles of the comparative catalyst Pd(phen)(p-toluenesulphonate)$_2$.

0.22 g of alternated copolymer are obtained corresponding to 41 g of CP/g of Pd. The copolymer has an LVN of 0.08 dl/g.

EXAMPLE 13

A) Synthesis of [Pd(bipy)(NBD—OCH$_3$)][PF$_6$]

0.50 g of [Pd(NBD)Cl$_2$] (1.86 mmoles) are suspended in 50 ml of methanol. 0.20 g of anhydrous Na$_2$CO$_3$ (1.87 moles) are added to the yellow suspension and the mixture is left to react under stirring at room temperature for 50 minutes. The colour of the suspension gradually changes from yellow to white. The white solid is then filtered, washed with cold methanol, ethyl ether and dried under vacuum (yield 95%).

0.30 g (0.57 mmoles) of white solid [Pd(NBD—OCH$_3$)Cl]$_2$ [d-(6-methoxy-2-norbornene-5σ,2π)-μμl-dichlorodipalladium] are suspended in 20 ml of methanol. 0.21 g of bipy (1.34 moles) are added to the suspension (ratio in moles Pd:bipy equal to 1:1.2) obtaining a yellow solution to which a solution of NH$_4$PF$_6$ (0.37 g) in methanol (3 ml) is added dropwise. The system is left under stirring at room temperature for 30 minutes, then the yellow solid is filtered under vacuum, washed with ethyl ether and dried under vacuum (yield 70%).

Elemental analysis for [Pd(bipy)(NBD—OCH$_3$)][PF$_6$][2,2'-dipyridyl)(6-methoxy-2-norbornene-5σ,2π)palladium hexafluorophosphate]: calculated values: C 40.7%, H 3.61%, N 5.28%; values found: C 40.3%, H 3.55%, N 5.20%;

B) Preparation of CO/styrene Copolymer

The same procedure is carried out as in example 1, using 0.05 mmoles of catalyst prepared in A).

0.09 g of alternated copolymer are obtained corresponding to 17 g of CP/g of Pd. The copolymer has an LVN of 0.16 dl/g.

EXAMPLE 14

A) Synthesis of [Pd(PMI)(COD—OCH$_3$)][PF$_6$]

0.30 g (0.53 mmoles) of white solid [Pd(COD—OCH$_3$)Cl]$_2$ are suspended in 60 ml of methanol. 0.15 g of PMI (1.28 mmoles) are added to the suspension (ratio in moles Pd:PMI equal to 1:1.2) obtaining a yellow solution to which a solution of NH$_4$PF$_6$ (0.35 g) in methanol (7 ml) is added dropwise. The system is left under stirring at room temperature for 30 minutes, then the yellow solid is filtered under vacuum, washed with ethyl ether and dried under vacuum (yield 80%).

Elemental analysis for [Pd(PMI)(COD—OCH$_3$)][PF$_6$]: calculated values: C 37.6%, H 4.54%, N 5.48%; values found: C 37.4%, H 4.51%, N 5.44%;

B) Preparation of CO/styrene Copolymer

The same procedure is carried out as in example 1, using 0.05 mmoles of catalyst prepared in A).

0.54 g of alternated copolymer are obtained corresponding to 101.5 g of CP/g of Pd. The copolymer has an LVN of 0.12 dl/g.

EXAMPLE 15

A) Synthesis of [Pd(TM—phen)(COD—OCH$_3$)][PF$_6$]

0.75 g (1.33 moles) of [Pd(COD—OCH$_3$)Cl]$_2$ are suspended in 60 ml of methanol. 0.75 g of TM—phen (3.2 mmoles) are added to the suspension (ratio in moles Pd:TM—phen equal to 1:1.2) obtaining a yellow solution to which a solution of NH$_4$PF$_6$ (0.88 g) in methanol (7 ml) is added dropwise. The system is left under stirring at room temperature for 30 minutes, then the yellow solid is filtered under vacuum, washed with ethyl ether and dried under vacuum (yield 80%).

Elemental analysis for [Pd(TM—phen)(COD—OCH$_3$)][PF$_6$]: calculated values: C 47.9%, H 4.98%, N 4.47%; values found: C 47.4%, H 4.84%, N 4.67%;

B) Preparation of CO/styrene Copolymer

The same procedure is carried out as in example 1, using 0.05mmoles of catalyst prepared in A). 0.71 g of alternating copolymer are obtained corresponding to 133 g of CP/g of Pd. The copolymer has an LVN of 0.04 dl/g.

EXAMPLE 16

Preparation of CO/ethylene Copolymer 0.5 mmoles of [Pd(bipy)(COD—OCH$_3$)][PF6] dissolved in 500 ml of CH$_3$Cl$_2$ and a mixture of CO/ethylene (1:1) are charged into a 2 liter autoclave up to a pressure of 40 atms. After 5 hours of reaction at 30° C., the pressure is discharged and the copolymer formed is precipitated by the addition of methanol (1.5 l). The copolymer is then filtered, washed with methanol and dried at 60° C. under vacuum. 4.5 g of alternated copolymer are obtained, resulting from NMR analysis, having an LVN equal to 0.4 dl/g, Mn=31,200, Mw=36,300, Mw/Mn=1.16.

EXAMPLE 17

Preparation of the Terpolymer CO/ethylene/styrene

The same procedure is carried out as in example 16, adding 45 ml of styrene. 4.0 g of alternated terpolymer CO/ethylene/styrene are obtained, resulting from NMR analysis, having an LVN equal to 0.4 dl/g.

We claim:

1. Process for the preparation of alternated linear copolymers, comprising reacting carbon monoxide and at least one compound containing an alkenylic unsaturation in the presence of a halogenated aromatic or aliphatic solvent which is liquid under the operating conditions and in the presence of a catalyst having general formula (I)

$$[Pd(chel)(chel')]^+[A^-] \qquad (I)$$

wherein chel represents a non-charged bidentate chelating agent, chel' represents an anion of an organic compound containing a double carbon—carbon bond linked via $\pi$ bond to the palladium (Pd) and a carbanion linked via $\sigma$ bond to the palladium;
wherein said organic compound contains an unsaturated cyclic portion; and wherein said organic compound further contains a substituent X—R group: where X is O or N and R is an alkyl, aryl or arylalkyl group; and
$A^-$ is an anion of a non-esterifiable or almost non-esterifiable and non-co-ordinating acid.

2. The process of claim 1, wherein said chel is a nitrogenated, phosphorated or mixed bidentate chelating agent.

3. The process of claim 2, wherein said nitrogenated bidentate chelating agent is represented by general formula (II)

$$\begin{array}{c} R_1 \diagdown \qquad \diagup R_2 \\ N-R-N \\ R_3 \diagup \qquad \diagdown R_4 \end{array}$$

wherein:
R represents an alkyl radical containing from 2 to 4 carbon atoms or a $C_2$-$C_4$ alkyl substituted with an alkyl or aryl group; $R_1$-$R_4$ the same or different, each represent a $C_1$-$C_{10}$ alkyl radical, $C_3$-$C_{10}$ cycloalkyl radical or a $C_6$-$C_{12}$ aromatic radical substituted with a $C_1$-$C_4$ alkyl or alkoxyl radical.

4. The process of claim 2, wherein said nitrogenated bidentate chelating agent is represented by general formula (III):

$$\begin{array}{c} Z \\ \diagup \diagdown \\ X \qquad Y \\ | \qquad | \\ N=C=N \end{array}$$

wherein:
X and Y the same or different, represent bridged organic groups having at least three atoms in the bridge of which at least two are carbon atoms;
Z represents an organic group selected from the group consisting of derivatives of 2,3-butanediol and 1,2-propanediol which prevent free rotation around the carbon—carbon bond.

5. The process of claim 4, wherein in addition to the carbon atoms, the X and Y groups contain other atoms selected from the group consisting of oxygen and nitrogen.

6. The process of claim 4, wherein said nitrogenated bidentate chelating agents have the same X and Y bridging groups and contain from 3 to 10 atoms of which at least two are carbon atoms.

7. The process of claim 2, wherein said nitrogenated bidentate chelating agent is represented by general formula (IV):

$$\begin{array}{c} X \qquad \qquad R_3 \\ \diagup \diagdown \qquad \diagup \\ N=\!=\!=C-C=N-C-R_2 \\ \qquad | \qquad \diagdown \\ \qquad R_1 \qquad R_4 \end{array}$$

wherein:
X represents a bridged organic group having at least three atoms in the bridge of which at least two are carbon atoms; $R_1$ represents a hydrogen atom, an alkyl or aryl group; $R_2$, $R_3$ and $R_4$ the same or different, each represent an alkyl, alkylaryl or aryl group.

8. The process of claim 7, wherein in addition to the carbon atoms, the X group contains other atoms selected from the group consisting of oxygen and nitrogen.

9. The process of claim 7, wherein said bridged X group contains from 3 to 10 atoms of which at least two are carbon atoms.

10. The process of claim 3, wherein said nitrogenated bidentate chelating agents are selected from the group consisting of: N,N,N'N'-tetramethyl-ethylenediamine-1,2; N,N,N',N'-tetramethylpropanediamine-1,3; 2,2'-bipyridyl; 4,4'-dimethyl-2,2'-bipyridyl; 4,4'-diphenyl-2,2'-bipyridyl; (−)-3,3'-[2,2-butandiol]-2,2'bipyridyl; (+)-3,3'-[2,3-propandiol]-2,2'-bipyridyl; 5,5'-dimethyl-2,2'-bipyridyl; 5-methyl-2,2'-bipyridyl; 1,10-phenanthroline; 4-methyl-1,10-phenanthroline; 5-methyl-1,10-phenanthroline; 4,7-dimethyl-1,10-phenanthroline; 3,8-dimethyl-1,10-phenanthroline; 4,7-diphenyl-1,10-phenanthroline; 4,7-dichloro-1,10-phenanthroline; 3,4,7,8-tetramethyl-1,10-phenanthroline; 4,4'-dimethyl-5,5'bioxazol; 2,2'-bipyrimidine; 2,2'-tetrahydrobioxazol; 2-pyridinalmethylimine; and 2-pyridinal-phenylethylimine.

11. The process of claim 2, wherein said phosphorated bidentate chelating agent is represented by general formula (V):

$$\begin{array}{c} R_3 \diagdown \qquad \diagup R_4 \\ P-R_1-P \\ R_2 \diagup \qquad \diagdown R_5 \end{array} \qquad (V)$$

wherein:
$R_1$ represents an alkyl radical containing from 1 to 4 carbon atoms or a substituted alkyl radical containing from 1 to 4 carbon atoms; $R_2$-$R_5$, the same or different, each represent a $C_1$-$C_{10}$ alkyl radical, $C_3$-$C_{10}$ cycloalkyl radical or a $C_6$-$C_{12}$ aromatic radical or said alkyl, cycloalkyl or aromatic radicals substituted with a $C_1$-$C_4$ alkyl or alkoxyl radical.

12. The process of claim 11, wherein said phosphorated bidentate chelating agent is selected from the group consisting of 1,3-bis(diphenylphosphine)propane and 1,3-bis(di-4-methoxy-phenylphosphine)propane.

13. The process of claim 1, wherein said chel' is a compound containing an unsaturated cyclic portion in its molecule.

14. The process of claim 13, wherein said compound is selected from the group consisting of a mono and bicyclic olefin which has a substituent X—R group, wherein X is O or N and R is an alkyl, aryl or aryl alkyl group.

15. The process of claim 14, wherein said olefin is selected from the group consisting of 5-methoxy-cyclocta-1-ene and 5-methoxy-2-norbornene.

16. The process of claim 1, wherein $A^-$ is an anion which is non-co-ordinating and non-esterifiable selected from the group consisting of hexafluorophosphate, tetrafluoroborate, fluoride ion, hexafluoroantimoniate, trifluoroacetate, mesitoate, dimethylbenzoate, trifluorobenzoate, tetrafluorobenzoate and pentafluorobenzoate.

17. The process of claim 1, wherein said polymerization reaction is carried out at a temperature of between 20° and 100° C. and at a pressure of between 1 and 100 bars.

18. The process of claim 17, wherein the temperature is between 25° and 50° C. and the pressure is not higher than 40 bars.

19. The process of claim 1, wherein said compound containing the alkenylic unsaturation is selected from the group consisting of ethylene, propylene, 1-butene, isobutylene, 1-pentene, 1-hexene, 1-octene, 1-dodecene, cyclopentent, styrene, p-methyl-styrene, m-methyl-styrene, p-ethyl-styrene, m-isopropyl-styrene, norbornene and their mixtures.

20. The process of claim 1, wherein the molar ratio of compound containing alkenylic unsaturation/carbon monoxide is between 10:1 and 1:10.

21. The process of claim 20, wherein the molar ratio is between 5:1 and 1:5.

22. The process of claim 20, wherein the molar ratio is about 1:1.

23. The process of claim 1, wherein the solvent is selected from the group consisting of benzene, toluene, chlorobenzene, dichloromethane, dichloroethane and chloroform.

24. The process of claim 1, wherein the catalyst (I) is predispersed in the halogenated aromatic or aliphatic solvent at a concentration of gram-atoms of palladium per mole of compound containing an unsaturation of the alkenylic type of between $10^{-6}$ and $10^{-1}$.

* * * * *